US007152064B2

(12) United States Patent
Bourdoncle et al.

(10) Patent No.: US 7,152,064 B2
(45) Date of Patent: Dec. 19, 2006

(54) SEARCHING TOOL AND PROCESS FOR UNIFIED SEARCH USING CATEGORIES AND KEYWORDS

(75) Inventors: Francois Bourdoncle, Paris (FR); Patrice Bertin, Houilles (FR); Eric Jeux, Paris (FR)

(73) Assignee: Exalead Corporation, Paris (FR)

( * ) Notice: Subject to any disclaimer, the term of this patent is extended or adjusted under 35 U.S.C. 154(b) by 0 days.

(21) Appl. No.: 09/929,463

(22) Filed: Aug. 14, 2001

(65) Prior Publication Data
US 2002/0052894 A1 May 2, 2002

(30) Foreign Application Priority Data
Aug. 18, 2000 (EP) .................................. 00402311

(51) Int. Cl.
G06F 17/30 (2006.01)
G06F 7/00 (2006.01)

(52) U.S. Cl. ............................................. 707/5; 707/6

(58) Field of Classification Search ................ 707/1–5, 707/10, 101, 102, 6, 104.1, 100, 9, 200–204; 712/501, 513; 704/1, 9; 709/203, 217, 218, 709/224; 715/501.1, 513
See application file for complete search history.

(56) References Cited

U.S. PATENT DOCUMENTS

| 5,463,773 | A |   | 10/1995 | Sakakibara et al. ......... 395/600 |
| 5,778,367 | A | * | 7/1998  | Wesinger et al. ............. 707/10 |
| 5,799,311 | A | * | 8/1998  | Agrawal et al. ............. 707/102 |
| 5,884,301 | A | * | 3/1999  | Takano .......................... 707/3 |
| 5,895,470 | A | * | 4/1999  | Pirolli et al. ................ 707/102 |
| 5,924,090 | A | * | 7/1999  | Krellenstein ................... 707/5 |
| 5,933,827 | A |   | 8/1999  | Cole et al. .................... 707/10 |
| 5,933,829 | A | * | 8/1999  | Durst et al. .................... 707/10 |
| 5,963,965 | A | * | 10/1999 | Vogel ........................ 715/501.1 |
| 5,991,756 | A |   | 11/1999 | Wu ................................ 707/3 |
| 5,995,979 | A | * | 11/1999 | Cochran .................... 707/104.1 |
| 6,014,678 | A | * | 1/2000  | Inoue et al. ................ 707/501 |
| 6,038,560 | A | * | 3/2000  | Wical ............................. 707/5 |
| 6,044,375 | A | * | 3/2000  | Shmueli et al. ............. 707/101 |
| 6,112,203 | A | * | 8/2000  | Bharat et al. .................. 707/5 |
| 6,145,003 | A | * | 11/2000 | Sanu et al. ................. 709/225 |
| 6,148,289 | A | * | 11/2000 | Virdy ............................ 705/1 |
| 6,167,397 | A | * | 12/2000 | Jacobson et al. .............. 707/5 |

(Continued)

FOREIGN PATENT DOCUMENTS

WO        WO 98/09229        5/1998

(Continued)

OTHER PUBLICATIONS

Ron Weiss et al.: Hypursuit: A Hierarchial Network Search Engine that Exploits Content-Link Hypertext Clustering, Feb. 3, 1996, ACM, pp. 180-193.*

(Continued)

*Primary Examiner*—Jeffrey Gaffin
*Assistant Examiner*—Jacques Veillard
(74) *Attorney, Agent, or Firm*—Welsh & Katz, Ltd.

(57) ABSTRACT

A database of entries, such as Web pages and sites, is provided. The entries are at least partially mapped to a set of predetermined categories. The entries are also associated with keywords, for instance, by automatic indexing of documents. In response to a query into the database, a user is provided with a series of refinement strategies, in addition to search results. Refinement strategies comprise categories relevant for the search, selected among the set of predetermined categories. Refinement strategies also include keywords dynamically selected among keywords associated with the entries. The user may easily navigate among the results to the query, and formulate new queries.

42 Claims, 11 Drawing Sheets

U.S. PATENT DOCUMENTS

| | | | |
|---|---|---|---|
| 6,169,986 B1 * | 1/2001 | Bowman et al. | 707/5 |
| 6,175,830 B1 * | 1/2001 | Maynard | 707/5 |
| 6,178,396 B1 * | 1/2001 | Ushioda | 704/1 |
| 6,199,061 B1 * | 3/2001 | Blewett et al. | 707/3 |
| 6,236,987 B1 * | 5/2001 | Horowitz et al. | 707/3 |
| 6,236,991 B1 * | 5/2001 | Frauenhofer et al. | 707/6 |
| 6,266,668 B1 * | 7/2001 | Vanderveldt et al. | 707/10 |
| 6,295,526 B1 * | 9/2001 | Kreiner et al. | 707/2 |
| 6,321,224 B1 * | 11/2001 | Beall et al. | 707/5 |
| 6,411,950 B1 * | 6/2002 | Moricz et al. | 707/3 |
| 6,421,675 B1 * | 7/2002 | Ryan et al. | 707/100 |
| 6,510,434 B1 * | 1/2003 | Anderson et al. | 707/100 |
| 6,571,240 B1 * | 5/2003 | Ho et al. | 707/5 |
| 6,658,408 B1 * | 12/2003 | Yano et al. | 707/3 |
| 6,704,722 B1 * | 3/2004 | Wang Baldonado | 707/3 |
| 6,704,729 B1 * | 3/2004 | Klein et al. | 707/5 |
| 6,728,696 B1 * | 4/2004 | Walton | 707/2 |
| 6,778,975 B1 * | 8/2004 | Anick et al. | 707/1 |
| 6,785,671 B1 * | 8/2004 | Bailey et al. | 707/3 |
| 6,785,677 B1 * | 8/2004 | Fritchman | 707/6 |
| 6,820,076 B1 * | 11/2004 | Bailey et al. | 707/3 |

FOREIGN PATENT DOCUMENTS

| | | |
|---|---|---|
| WO | WO 98/49637 | 5/1998 |

OTHER PUBLICATIONS

Ron Weiss et al.: Hypursuit: a Hierarchical Network Search Engine That Exploits Content-Link Hypertext Clustering.*

Weiss R. et al.: "hypursuit: A hierarchical Network Search Engine That Exploits Content-Link Hypertext Clustering", Mar. 1996.*

Ron Weiss et al.:HyPursuit: A hierarchical Network Search Engine that Exploits Content-Link Hypertext Clustering. Mar. 1996, ACM, pp. 180-193.*

Susan Dumais et al.: Optimizing Search by Showing Results In Context, Mar./Apr. 2001, ACM, vol. 3, Issue 1, pp. 277-284.*

Lev Finkelstein et al., Placing Search in Context: The Concept revisited, Jan. 2002, ACM Press, vol. 20, issue 1, pp. 116-131.*

Marti A. Hearst et al., Cat-a-Cone: an interactive interface for specifying searches and viewing retrieval results using a large category hierarchy, 1997, ACM Press, vol. 31, issue si, pp. 246-255.*

Two page European Search Report; Application No. EP 00 40 2311 and one page Annex thereto.

Weiss, R. et al.: "Hypursuit: A Hierarchical Network Search Engine That Exploits Content-Link Hypertext Clustering".

IBM® Technical Disclosure Bulletin, vol. 40, No. 05; May 1997; Taxonomized Web Search.

Eguchi, K., et al. "Adaptive and Incremental Query Expansion for Cluster-Based Browsing".

Hearst, M, et al. "Cat-a-Cone: An Interactive Interface for Specifying Searches and Viewing Retrieval Results Using a Large Category Hierarchy".

Ineractive Term Suggestion For Users of Digital Libraries: Using Subject Thesauri And Co-occurrence Lists For Information Retrieval; Bruce R. Schatz et al., Digital Library Initiative, Grainer Engineering Library Information Center, University of Illinois at Urbana-Champaign, 1996, p. 126-133.

Interactive Internet Search: Keyword, directory and query reformulation mechanisums compared, Peter Bruza et al. (2000). Special Interest Group on Information Retrieval (SIGIR).

Leouski, A. et al. "An Evaluation of Techniques for Clustering Search Results".

* cited by examiner

FIG. 1B

9 →  📄 The Greenhouse Effect

The greenhouse effect is a natural process. Greenhouse gases in the atmosphere trap heat energy from the sun raising the temperature of the earth about 30 degrees C. Without these greenhouse gases...
pw2.netcom.com 11 →  📄 Many scientists believe runaway greenhouse effect possible A Greenpeace poll in 1992 shows that a worryingly high proportion of climate scientists believe it possible that continuing emissions of greenhouse gases can awaken synergistic feedbacks capable of...
www.greenpeace.org
► Society :...: Environment : Climate Change 📄 MSNBC A greenhouse effect on Mars A greenhouse effect on Mars. Dry-ice coulds.might have.kept planet.warm enough.for water to flow. In the 1970s a Viking orbiter sent back pictures of erosion channels on Mars like this one. that led...
www.msnbc.com 📄 greenhouse effect

Encyclopedia.com...
www.encyclopedia.com
► References: ... : Encyclopedia.com : G 📄 Carbon Dioxide and the Greenhouse Effect

SOAR Project Members of Team 2. Teresa Huckleberry. Kelli Ramer. Susan Schatz. Deborah Niles. What is the Greenhouse Effect and why does it matter. The Greenhouse Effect occurs when greenhouse gases...
www.gallaudet.edu 📄 Concern about acid rain the greenhouse effect photochemical smog and threats to the ozone layer ATMOSPHERIC CHEMISTRY RESEARCH. The Department of Chemistry and. The Center for Atmospheric Chemistry. GRADUATE STUDIES. Concern about acid rain the greenhouse effect photochemical smog and threats...
www.cac.yorku.ca 1 2 3 4 5 6 7 8 9 10 11 12 13 14 15 16 17 18 19 20  ►►

FIG. 2

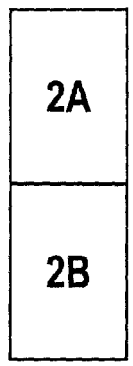

FIG. 2A

World Wide Web      Web Francophone
Look for: [greenhouse effect] [OK]
Search path                                                                                              [Edit]

▶ Greenhouse effect: Issues

Categories                Results 1-10 of 26                              ▶ ▶

+Activism

Keywords                 Many scientists believe runaway greenhouse effect possible -Global warming        A Greenpeace poll in 1992 shows that a worryingly high proportion
 debate                    of climate scientists believe it possible that continuing emissions
- Global warming         of greenhouse gases can awaken synergistic feedback capable
- Greenhouse gases      of...
- Warming trend                  www.greenpeace.org
- Greenhouse warming    ▶ Society : ... : Environment: Climate Change
- Intergovernmental Panel   Belgium Federal Department of the Environment Climate Change
- Global temperature     Climate change web pages of the Belgian federal environment
- Average global          administration. Site has general information on the greenhouse
- Temperature increases   effect policy and legislative information and related links...
- Global problems            www.environmental.tgov.be
- CO2 emissions          ▶ Science : Environment : Global Change
- Lower troposphere      New Scientist Global Warming Report
- Mean temperature       Includes a global warming science FAQ global warming politics
- Deep ocean               FAQ a timeline and daily reports from the 1997 Kyoto Conference...
                                    www.newscientist.com
                            ▶News :...: Environmental Issues : Climate and Earth Changes
                       Mainstream Press Misdeeds
                       Judi Bari's refutation of mainstream press distorting information
                       about Earth First and other activist groups is layed out at the
                       bottom of this editorial page by Jeff Elliott...
                            www.monitor.net
                         ▶Society :...: Free Speech : Subverted

FIG. 2B

 Global Warming Scare Origins
>  Authoritative account of computer modeling. Leading British scientists explains how an inadequate model started the bandwagon...
>  www2.prestel.co.uk
>  ►Society :...: Anti-Environmentalism : Global Warming Myths

 The Threat of Asteroidal and Cometary Impacts
>  Report by J.R. Tate of Spaceguard UK. Includes Executive Summary. Japanese research indicates that there is a 1 chance that every major city on the Pacific Rim will receive catastrophic damage from...
>  dspace.daip.pex.com
>  ►Society :...: Catastrophes : Large Near Earth Object Impacts

 QuoteFile
>  Politically progressive quotations arranged topically...
>  www.lancs.ac.uk
>  ►Reference : Quotations
>  ►Society :...: Free Speech : Improving

 Global Change and Environmental Education Resources
>  materials and links...
>  www.gcrio.org
>  ►Science : Environment : Education

 GCRIO Global Change and Environmental Education Resources
>  This collection of resources was selected for their relevance to global change and environmental education. Included are a wide range of resources for educators and students at all levels...
>  gcrio.gcrio.org

 Scientists for Global Responsibility
>  SGR promotes responsible use of science and technology in society and explores the ethical dimension of scientific research ethical controversies global energy and resource issues alternative...
>  www.sgr.org.uk
>  ►Science : Science in Society : Research Ethics
>  ►Society :...: Applied : Science and Technology 1 2 3 ►►

FIG. 3

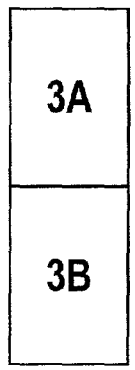

FIG. 3A

World Wide Web     Web Francophone

Look for: [ greenhouse effect ] [OK]

Search path        [Edit]

▶ Greenhouse effect: Fossil fuels

Categories     Results 1-10 of 66     ▶▶

+ Society
+ Science

Keywords
- Greenhouse gases
- Climate system
- Ice caps
- Warming trend
- Global carbon
- General circulation models
- Carbon dioxide
- Global average temperature
- Atmospheric CO2
- Radiative forcing
- Water vapour
- Koto conference
- Alternative energy sources

Greenhouse Effect
Next Stars Galaxies and the Up Human Consequences Previous Acid Rain Greenhouse Effect. As glass in a greenhouse traps heat inside gases in the upper atmosphere trap some of the heat escaping the...
theory.uwinnipeg.ca The Greenhouse Effect
The greenhouse effect is a natural process. Greenhouse gases in the atmosphere trap heat energy from the sun raising the temperature of the earth about 30 degrees C. Without these greenhouse gases...
pw2.netcom.com A Primer on Ozone Depletion The Environment Citizenship Series
The Green Lane Ozone Home Page Search Français Back to Ozone depletion. A Primer on Ozone Depletion. The Environmental Citizenship Series. ACKNOWLEDGEMENTS. We would like to take this opportunity to...
www.ec.gc.ca Landover Baptist Church
If religion is the drug of the masses then this is the church that gives you the munchies. The kind of stuff that got Jerry Falwell kicked out of Sunday School. Naughty hilarious and almost...
www.landoverbaptist.org
▶ Society : Religion and Spirituality : Humor

FIG. 3B

📄 New Scientist Global Warming Report
 Includes a global warming science FAQ global warming politics
 FAQ a timeline and daily reports from the 1997 Kyoto Conference...
  www.newscientist.com
  ► News :...: Environmental Issues : Climate and Earth Changes
  ► Science : Environment : Global Change
  ► Society :...: Environment: Climate Change 📄 The EPA Global Warming Site Glossary of Climate Change Terms
 ABCDEFGHIJKLMNOPQRSTUVWXYZ. Absorption or Radiation.
 The uptake of radiation by a solid body liquid or gas. The absorbed
 energy may be transferred or re-emitted. Acid Rain. Also...
  www.epa.gov 📄 AGO What's New
 What's New. May 2000. Week of 8-12 May. International. Notice
 of the Australian Government Review of The Intergovernmental
 Panel on Climate Change Third Assessment Draft Reports and
 invitation to...
  www.greenhouse.gov.au 📄 Resources for Middle School Science 5.8 Matter and Energy in the Biosphere
 PREVIOUS ENTRY. The Local Environment. CORE MATERIALS.
 NEXT ENTRY. Middle Grades Science A Problem-Solving
 Approach Sixth Grade.5.8 Matter and Energy in the Biosphere.2nd
 ed. Francis M. Pottenger...
  www.nap.edu 📄 The LAB Big Fat Science
 by Bernadette Hobbs. For 15 years now we've been pelted with
 details about the greenhouse effect and global climate change.
 But does a worldwide obsession with composting and rifling
 through garbage...
  ► www.abc.net.au 📄 A Climate-Protection Technology But Not a Magic Bullet The Global Citizen 2000 02 24
 Donella Meadows The Global Citizen February 24, 2000. A
 Climate-Protection Technology but Not a Magic Bullet. The
 February issue of Scientific American tells of a new technology
 that makes me both...
  usd.ca 1 2 3 4 5 6 7 ►►

FIG. 4

World Wide Web      Web Francophone
Look for: [ greenhouse effect     ] [OK]
Search path                                                                                                               [Edit]
► <u>Greenhouse effect</u>: Issues : CO2 emissions
Results 1-6 of 6

Global Warming Scare Origins
    Authoritative account of computer modeling. Leading British scientist explains how an inadequate model started the bandwagon...
        www2.prestige.com.uk
    ► Society :...: Anti-Environmentalism: Global Warming Myths

Still waiting for Greenhouse
    Non-believers in global warming present evidence to show that global warming has been grossly exaggerated...
        www.vision.net.au
    ► Society :...: Environment : Climate Change

FMN Policy Spotlight Global Warming
    resources casting a skeptical eye at sometimes outlandish environmental claims...
        www.free-market.net

Population Control How Many Are Too Many
    Article from IMPACT Press a bimonthly socio political magazine based in Orlando FL...
        www.impactpress.com
    ► Society :...: Population : Pro-population control

Global Warming Projections for the New Millennium
    Environmental Defense Fund EDF charts vividly demonstrate what may be in store for Earth unless greenhouse-gas pollution is brought under control...
        www.edf.org
    ► Society :...: Activism : Global Warming

Environmental Effects of Increased Atmospheric Carbon Dioxide Anti Global Warming Petition Project
    The Anti Global Warming Petition Project published a scientific-appearing article contradicting many of the IPCC findings. Much of the information is sound even if the conclusions are biased...
        sitewave.net

FIG. 5

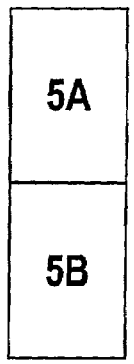

FIG. 5A

World Wide Web    Web Francophone
Look for: [ greenhouse effect     ] [OK]
Search path                                                    [Edit]
▶ Society : Issues : Environment : Climate Change
Categories              Results 1-8 of 122                     ▶▶
+ Activism
+ News                  Many scientists believe runaway greenhouse effect possible
+ Proposed Tech Fixes         A Greenpeace poll in 1992 shows that a worryingly high proportion
                        of climate scientists believe it possible that continuing emissions of
                        greenhouse gases can awaken synergistic feedbacks capable of
                        generating a runaway greenhouse effect...
                               www.greenpeace.org
                        Global Warming Understanding Greenhouse Gases for Education and
                        Learning
                               Learn the Science of Global Warming.. Global Warming
                        Understanding Greenhouse Gases for Education and Learning.
                        The Science of Global Warming. (...) on experimental tool for
                        invistigating global warming and the greenhouse effect. Several
                        background topics are included irradiation photons molecules and...
                               seeds2lm.com
                        Still Waiting for Greenhouse
                        ...that global warming has been grossly exaggerated. Still Waiting
                        For Greenhouse. This web site is best viewed with a resolution (...)
                        Tasmania.25 July 1999. John L. Daly. Still Waiting for Greenhouse.
                        A Lukewarm View of. Global Warming. from Tasmania. by...
                               www.vision.net.au
                        Belgium Federal Department of the Environment Climate Change
                               Climate change web pages of the Belgain federal environment
                        administration. Site has general information on the **greenhouse
                        effect** policy and legislative information and related links...
                               www.environment.fgov.be
                               ▶ Science : Environment : Global Change

FIG. 5B

 Belgium Federal Department of the Environment Climate Change
Climate change web pages of the Belgain federal environment administration. Site has general information on the greenhouse effect policy and legislative information and related links...
www.environment.fgov.be

 Environmental Effects of Increased Atmospheric Carbon Dioxide Anti Global Warming Petition Project
...markedly increased plant growth rates. Predictions of harmful climatic effects due to future increases in minor greenhouse gases like CO2 (...) been responsible for much of this increase. But the effect on the environment is likely to be benign. Greenhouse gases...
sitewave.net
► Society :...: Activism : Global Warming

 Global Warming Projections for the New Millennium
... vividly demonstrate what may be in store for Earth unless greenhouse-gas pollution is brought under control.. Environmental Defense Global (...) may be underestimated in that case. In each case effects are felt far into the future because greenhouse gases continue...
► www.edf.org

 The Center for Energy Climate Solutions CECS
... Climate Solutions CECS a one-stop shop that helps reduce greenhouse gas emissions with practical advice tools and technologies provided (...) Joseph Romm. How to Boost Profits and Productivity by cutting Greenhouse Gas Emissions. Welcome to Cool-Companies.org the official...
► www.cool-companies.org 1 2 3 4 5 6 7 8 9 10 11 12 13 ► ►

SEARCHING TOOL AND PROCESS FOR UNIFIED SEARCH USING CATEGORIES AND KEYWORDS

This application claims the benefit of priority of EPO application Ser. No. 00402311.5, filed Aug. 18, 2000, and entitled Searching Tool And Process For Unified Search Using Categories And Keywords.

FIELD OF THE INVENTION

The invention relates to the field of information retrieval, and more specifically to displaying results to a search query, as well as navigating in databases and inputting requests to databases. It particularly applies to searches on the Internet.

BACKGROUND OF THE INVENTION

Throughout the present specification, the word "site" or "internet site" refers to a number of documents connected by links, with a given entry point. A directory is the result of indexing a number of sites or documents and of classifying these into categories; categories are therefore subsets of the directory, which are usually defined in a manual operation. Such categories are often organized in a tree to facilitate navigation among categories; one may also use categories organized in a directed acyclic graph, that is a graph with a plurality of paths to the same category. A search engine is a tool for searching among documents, usually embodying automatic indexing of the documents.

A number of searching tools exist for searching and retrieving information on the Internet. Alta Vista Company proposed an Internet search site with a request box where the user may input keywords for retrieving information. The language of the search may be restricted. A box is provided that allows the user to select related searches; the related searches actually display phrases or sequences of words, which contain the current request as a substring. For instance, if the request inputted by the user reads: /greenhouse effect/ (in the rest of this specification, the request will be marked by //), related searches could offer the following choices:

the greenhouse effect,
what is the greenhouse effect,
enhanced greenhouse effect.

There is also proposed a search among site categories. Such a search is actually an independent category search in a separate database. The results of the search are displayed to the user under the list of related searches. The results are displayed as a list of documents or sites.

Another Internet search site is proposed by Yahoo!, Inc. There is again provided a request box. Results of a search inputted to the request box are displayed in several sections. The first section displays the category matches, together with the path to the matches in the category tree, while the second section displays site matches. The third section displays web pages.

With the same example of /greenhouse effect/, the first category match is "global warming." The path to "global warming" in the category tree is Home>Society and Culture>Environment and Nature. There may be provided several paths to the same category. In the example of /greenhouse effect/, the category entitled "global warming" appears in five different paths. Selecting a category in the first section allows the user to access the contents of the category.

The second section displays site matches. Matches are clustered according to their categories. The third section displays web pages, together with a summary and an address. Google, Inc. also provides an Internet site for search among sites and categories. The results of a search contain an indication of the classification of sites and categories. When inputting the keywords for a search, some words may be excluded. Selecting the category search provides the user with a list of categories that may relate to the search; the contents of each category may later be accessed. In the example of the /greenhouse effect/ search, categories include Society / Issues / Environment / Climate Change.

A. V. Leouski and W. Bruce Croft, An Evaluation of Techniques for Clustering Search Results, CIIR Technical Report IR-76, National Center for Intelligent Information Retrieval, University of Massachusetts Amherst, Mass., Spring 1996, compare classification methods from Information Retrieval and Machine Learning for clustering search results in a search engine. Apart from clustering techniques, this document discusses cluster description. A first method for describing a cluster consists in selecting a number of the most important terms from the documents comprised in the cluster, and in presenting them to the user. A second preferred method is to replace the important terms with important phrases, where a phrase is as a sequence of one or more words. This document provides a solution to the problem of dynamically clustering documents retrieved from a database by a search engine.

U.S. Pat. No. 5,463,773 discloses the building of a document classification tree by recursive optimization of keyword selection function. There is provided retrieval means for extracting keywords when a document data is inputted, and outputting a classification for the document data, the classification being selected among the classification decision tree. For extracting keywords, this document suggests extracting keywords defined by word sequences. A learning process is suggested for building automatically a document classification tree on the basis of the extracted keywords.

U.S. Pat. No. 5,924,090 proposes searching among documents, and mapping the keywords of the documents among static categories. Categories are therefore predefined in a manual process. The use of categories makes it possible to access documents included in the categories that are mapped to the categories. In this document, a search engine provides the results of a query, the results are mapped onto the static categories, and relevant categories are displayed to the user as search folders. When a search folder is selected by the user, the documents included in the search folder, that is, the documents mapped onto the corresponding category, are displayed to the user. A series of search folders is displayed any time a search is carried out, the search folders being those static categories into which a number of documents retrieved were mapped.

U.S. Pat. No. 5,963,965 discloses a method where relevant sets of phrases are automatically extracted from text-based documents in order to build an index for these documents. These phrases are then grouped together in clusters to form a plurality of maps which graphically describe hierarchical relationships between the clusters, and can be used to extract relevant portions of the documents in answer to the user selecting one of these clusters.

U.S. Pat. No. 5,991,756 describes a method according to which search queries may be applied to a set of documents organized in a hierarchy of categories, and where the user is presented in response with a subset of these categories which contain the documents relevant to the query.

WO-A-98 49637 suggests organizing results of a search into a set of most relevant categories. In response to a search, the search result list is processed to dynamically create a set of search result categories. Each of the search result categories is associated with a subset of the records within the search result list having common characteristics. Categories are then displayed as folders.

The prior art information retrieval methods and processes have a number of shortcomings. Fixed or static categories actually provide a representation of the world—a set of documents—at a given time point and for a given field of the art. They may need updating, or adapting to new types of documents, when and if the set of documents is completed by new documents, especially by documents in a new field of the art. While static categories may therefore represent accurately the expertise of the human being who defined them, they are in fact limited to this expertise. In addition, any set of categories is limited by the amount of human work needed for completing categories and mapping entries of the database to the categories.

Clusters formed of keywords may provide a dynamic vision of the word. However, they do not provide an easily browsable tool, and do not allow the user to navigate easily and freely among documents.

Category searches are adapted to searching among sites. Keyword searches are more adapted to searching among separate textual documents. Therefore, there is a need for an information retrieving process and tool that enables a user to navigate not only among fixed categories, but also among keywords.

SUMMARY OF THE INVENTION

The present invention thus proposes a searching tool and process enabling its user to freely navigate among categories and keywords, in a friendly and transparent fashion. The invention combines the advantages of a set of human-made categories, notably expertise in a given field, together with the advantages of a keyword search, notably the ability to process and handle documents outside of said given field. The present invention provides a tool that is well adapted to searching among a database of sites and separate documents or pages.

More specifically, the present invention provides a process for searching a database of entries, including the steps of: a) providing a database of entries, at least part of said entries being mapped to a set of categories, at least part of said entries being associated with keywords, b) in response to a query of a user, selecting categories among said set of categories according to the entries returned by said query, c) dynamically selecting keywords associated to the entries returned by said query, and d) displaying to the user said selected categories and said selected keywords.

In a particular embodiment of the process, the categories are organized in a tree or directed acyclic graph structure. A keyword may preferably be a sequence of words or a sequence of stemmed words.

Selected categories and keywords may be displayed similarly, or separately. In a particular embodiment of the process, a new query is started when a user activates one of said displayed categories and keywords. This step of activating may include refining the said query of the user to the said category or keyword. This step of activating may also include excluding from the said query of the user a displayed category or keyword.

In another embodiment of the process, a list of entries returned by the query is displayed to the user. One may then display in said list a category to which at least an entry of said list is mapped. When the user selects this category in the list, the entries included in the selected category may be displayed. In this case the entries included in said category may be ranked before they are displayed.

Additionally, when categories are hierarchically organized, the step of displaying may include displaying categories of different hierarchical levels. The invention also provides a searching tool, including a search server for receiving queries from users and transmitting results to users, a database of entries, at least part of said entries being mapped to a set of categories, at least part of said entries being associated with keywords; wherein the search server includes means for searching the database and for selecting categories among said set of categories according to the entries returned by said query, means for dynamically selecting keywords associated to the entries returned by said query, and wherein the results transmitted to the users comprise said selected categories and said selected keywords.

The search server is preferably a HTTP server. When the entries are textual entries, the database may comprise an inverted index, the categories being entries of said inverted index.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings. A search tool embodying the invention will now be described, by way of example only, and in reference to the attached drawings, where:

FIG. 2 is another view of the display of the searching tool of FIG. 1, after the search is limited to a category;

FIG. 3 is another view of the display of the searching tool of FIG. 1, after the search is limited to a keyword;

FIG. 4 is another view of the display of the searching tool of FIG. 2, after the search is limited to a keyword;

FIG. 5 is another view of the display of the searching tool of FIG. 1, after the search is limited to a category of the list of results;

DETAILED DESCRIPTION OF THE INVENTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

It is to be further understood that the title of this section of the specification, namely, "Detailed Description of the Invention" relates to Rules of the U.S. Patent and Trademark Office, and is not intended to, does not imply, nor should be inferred to limit the subject matter disclosed herein or the scope of the invention.

In response to a query, the invention suggests displaying to the user a series of refinement strategies; the refinement strategies comprise relevant categories selected among a set of static categories. In addition, the series includes keywords dynamically obtained from the documents provided in response to the query. The invention allows the user to refine the search using predefined categories; in addition, displaying keywords allows the user to navigate more easily among the results of the query, without being limited to the fixed categories.

In the rest of the specification, the invention is disclosed in reference to its preferred embodiment; the database covers the World Wide Web, and includes Internet sites as well as Web documents. The tool according to the invention allows the database to be searched thanks to a HTTP server.

More generally, the invention may apply to any database where entries are at least partially mapped to predetermined categories, and may be associated with keywords. Mapping is usually a manual operation, although it is possible to use any automatic process. Textual entries may easily be associated with keywords, e. g. by automatically indexing the entries and selecting keywords. In this case, automatic mapping to categories may be carried out based on keywords.

Figure 1:
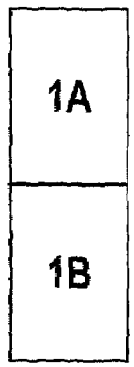
FIG. 1 is a display of a searching tool according to the invention.
Figure 1A:
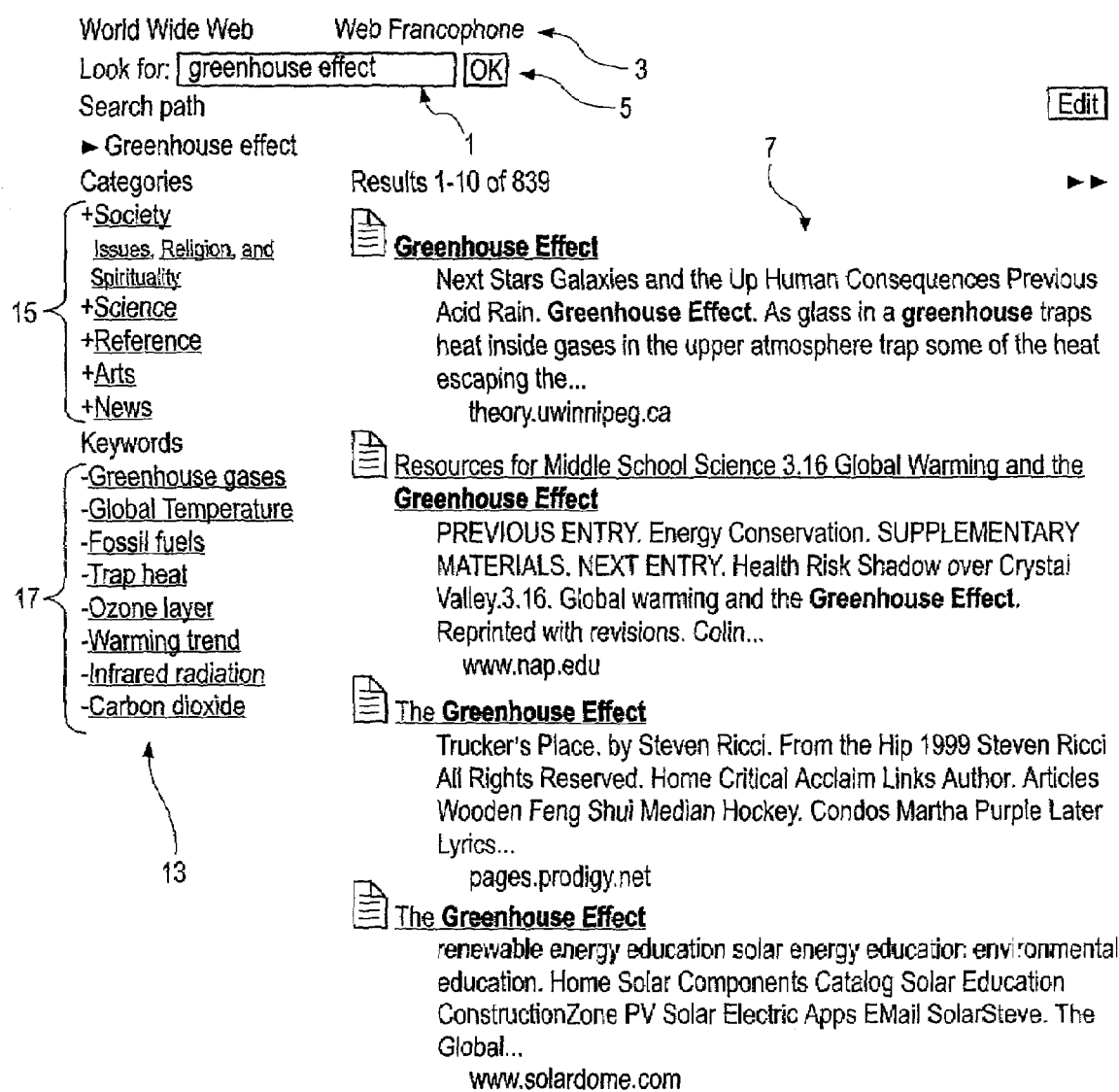

FIG. 1 is a display of a searching tool according to the invention. A request box 1 is displayed to the user, for inputting a number of keywords for a search or query. In the example of FIG. 1, the inputted search is again /greenhouse effect/. In a way known per se, the search may be limited to part of the database, in the example of FIG. 1 due to line 3. In the example of FIG. 1, the search is not limited, and the "World Wide Web" selection appears in bold on line 3. The "OK" button 5 permits the user to start the search or query. The current search path is displayed to the user under the request box. The use of the search path will be explained in reference to FIGS. 2 and 3.

In response to the search, a number of documents or sites are returned. Retrieval of documents, that is, selection of sites or documents among a database of indexed or partially indexed documents or sites, may be carried out in any way known in the art. It is notably possible to use an inverted index, such as the AltaVista Search Developer's Kit, sold by AltaVista Company. More specifically, a query inputted in the query box by the user is parsed into an internal representation, which is then translated into a request applied to the inverted index. This request is formulated according to the features supported by the inverted index. Usually supported features include ranking, boolean searches, phrase searches, stemming, proximity searches, etc.

A number of these documents or sites returned by the inverted index are displayed to the user in response to the query. In the example of FIG. 1, the right-hand part of the lowermost section of the display provides the user with a list 7 of documents and sites. Together with each document, it is possible to display a summary of the document or site, as shown in FIG. 1, on the line immediately under each document or site. An icon representative of the nature of the answer may also be displayed. In the example of FIG. 1, icon 9 is representative of a document, while icon 11 indicates that the answer is actually a site. The address for accessing the document may also be displayed, as shown in FIG. 1 on the line under the summary of each document or site. When a document is part of a given category, this category may be displayed as well. In the example of FIG. 1, the sixth document in the list 7 of results returned by the query is entitled "Many scientists believe runaway greenhouse effect possible." This document is actually referenced in the category Climate Change with the access path "Society: . . . : Environment: Climate Change" in the category tree. The eighth document is also referenced in a category. As shown in FIG. 1, it is possible for the user to select the category displayed under a result. The effects of selecting a category in the list of results are explained in reference to FIG. 5.

It should be understood at this point of the description that the directory of categories in this embodiment of the invention is given as an example of predefined or static set of categories. In this specification, the words "predefined" or "static," as opposed to "dynamic," should be understood in that the set of categories is not amended every time a user inputs a query. Still, it may of course be amended to add or remove categories.

In addition to supplying a list of documents or sites returned by the query, the invention suggests displaying to the user a series 13 of refinement strategies. These refinement strategies comprise categories selected among the predefined set of categories. In the example of FIG. 1, categories and keywords are displayed as two separate lists 15 and 17, under the request box and the search path. Thus, the refinement strategies "Society" and "Science" in the example of FIG. 1 are actually predefined categories.

The predefined categories may be selected in any process known to one skilled in the art. One may, for example, select the categories most frequently associated with the documents or sites returned by the query. In one way or another, a number of categories are selected and displayed to the user, in response to the query.

As shown in FIG. 1, one may display several levels of categories. In the example, category "Society" is displayed with several sub-categories, viz. "Issues," "Religion and Spirituality." The number of levels of categories displayed may be selected as discussed above, according to the number of documents or sites returned by the query to be found in a category. The interest of doing so is to guide faster the user into a relevant refinement, by skipping intermediate categories in the hierarchy of categories.

In addition to selected predefined categories, the refinement strategies displayed to the user includes a number of dynamically derived keywords. In the example of FIG. 1, these keywords appear in a list separate from the list of categories. Contrary to this embodiment, refinement strategies could be displayed without identifying predefined categories and dynamically derived keywords. In this case, the user would not distinguish between predefined categories and keywords. The keywords depart fundamentally from predefined categories.

First, categories are limited in number, and are a representation of the world, at the time the database is built. In contrast, keywords, whatever way they are constructed, do not constitute a representation of the world, but simply a way to retrieve documents. In a way, they have no meaning per se and are much more low level than categories.

Second, in view of this difference, the number of categories is much lower than the number of keywords. The number of categories is typically around thousands or tens of thousands; the number of keywords may amount more than the number of plain words in the language. Typically the number of keywords could be several millions or tens of millions.

Third, categories may not be manipulated, and the mapping of entries to categories does not change when a request is processed. Consequently, when a category is selected, all documents of the category are selected. Since the category is a set of documents, even if it has a name for the purpose of displaying it to the user. In contrast, keywords are objects without meaning that can be manipulated while formulating or refining a query. Specifically, when a query is refined by a category, the resulting documents are a subset of the category. When a query is refined by a keyword, the resulting documents need not be associated statically with the keyword.

The difference between keywords and categories appears in FIGS. 1-5. Along the search, categories of the higher level disappear, as the user navigates downwards in the hierarchy of categories. This is the case where categories are organized hierarchically, e.g., in a tree or directed acyclic graph.

In case the invention is applied to a database of textual entries, there is provided an inverted index for retrieving entries. Categories are then necessarily entries of the inverted index, while keywords are not necessarily entries of the inverted index.

For instance, assume keywords are sequences of words. The keyword "fossil fuels" could then be associated to every document that contains the exact sequence of words "fossil fuels," at the time the database is built. When the keyword "fossil fuels" is selected by the user as a refinement strategy, the query may return documents not only containing "fossil fuels," but also documents containing separate occurrences of the words "fossil" and "fuels." Examples of algorithms for processing keywords—e.g. thanks to stems or synonyms—are given below.

For dynamically deriving the keywords from the entries returned by the query, one may use any process known in the art. In this respect, the keywords may include words or a sequence of words. As displayed in FIG. 1, it is preferred that the keywords be comprised of sequences of words. One may for instance, in a first phase of operation conducted prior to the queries, derive from all documents in the database a set of relevant sequences of words, e.g., using the algorithm described by Y. Choueka in "Looking for Needles in a Haystack or Locating Interesting Collocational Expressions in Large Textual Databases" (Conference on User-Oriented Content-Based Text and Image Handling, MIT, Cambridge, Mass., pp. 609–623, 1988). This step forms a database of keywords. Then, in a second phase of operation conducted in response to the user's query, one may dynamically extract from this keyword database the keywords associated with the set of documents selected by the query and select the most frequently appearing ones as the set of keywords to be displayed to the user.

For enhancing retrieval effectiveness of the search engine, keywords may also include stems (or prefixes), instead of words, or sequences of stems of prefixes. For instance, a stem like "telephon*" covers words like "telephone," "telephones," "telephony" and the like. The stem "mobil*" covers the words "mobile," "mobiles," "mobility," etc. In the example of "mobile telephone", using as a keyword the sequence of stems "mobil* telephon*" provides a more effective use of keywords. In such a setting, a given keyword K is associated to a set S(K) of sequences of words. For instance, for the keyword "mobil* telephon*", the set S("mobil* telephon*") comprise "mobile telephone," but also "mobile telephony," "mobile telephones," "mobility telephoning," and the like. Each word may be automatically associated to its stem, by using the algorithm disclosed in M. F. Porter, An algorithm For Suffix Stripping, Programs, vol. 14 no. 3, pp. 130–137, July 1980.

When keywords comprise stems, a document may be associated to a keyword K if the document contains any word or sequence of words in the set S(K) of the keyword K. At this point, one should note that the displayed keywords do not necessarily cover all relevant documents or sites, contrary to the suggestion of reference WO-A-98 49637.

The invention thus suggests displaying to the user, in response to the query, selected categories as well as dynamically selected keywords. Both may be used for refining the search strategy, as explained now.

The user may select one or more of the displayed categories and keywords for refining the search strategy. Selecting a displayed category or keyword issues a new query, refined by the newly selected category, or by the newly selected keyword. For instance, selecting the sub-category "Issues" in the example of FIG. 1 would return the documents and sites concerning greenhouse effect and contained in the predetermined sub-category "Issues" of the category Society. FIG. 2 is the corresponding display. It is similar to the display of FIG. 1, except that the search path indicates that the search is limited to the category "Issues." In addition, the documents and sites returned by the query are different from the ones of FIG. 1. Notably, the number of hits or results is 26 instead of 839. Last, FIG. 2 shows that the keywords and categories are updated, according to the results returned by the query. Limitation through categories, as exemplified on FIG. 2, normally returns a subset of the set of hits or results provided by the first query.

By selecting and displaying categories, and allowing a user to refine a query due to these categories, the invention makes it possible for the user to benefit from the expertise embodied in the predetermined categories. In addition, by selecting keywords and displaying these keywords, the invention avoids the limitations inherent to any system of predetermined categories. Categories and keywords are provided transparently to the user. Navigation among documents thus remains simple and effective, and does not require any specific skill from the user.

In the embodiment of FIG. 1, a "minus" sign is provided in front of each of the keywords. In a particular embodiment of the invention, this sign is used for excluding from the query the corresponding keywords. For instance, in the example of FIG. 1, selecting the "minus" sign in front of "greenhouse gases" may exclude from the query all documents containing the keyword "greenhouse gases." This feature of the invention makes it possible to more easily reduce the number of answers, by excluding those answers containing certain keywords. Selecting the link to a keyword generates a new query, with the keyword. FIG. 3 shows the display obtained by selecting the keywords "fossils fuels" in the example of FIG. 1. It is again similar to the displays of FIGS. 1 and 2. However, the search path is updated, as well as the list of keywords and categories. The list of results is also different. One should note at this point that the results obtained in such a refinement of the search to a specific keyword are not necessarily a subset of the results of the original query. Indeed, this may depend on the algorithms used for the search, and notably of the way sequences of words are handled in this algorithm.

For instance, assume that the user originally inputs the word /climate/ in the request box. The first query would then return documents containing exactly the word "climate". Assume the user then selects a refinement strategy, e.g. the keyword "fossil fuels" among the list of keywords. The reformulated query may then be /climat* fossil* fuel*/, where "climat*" is the stem for "climate," "fossil*" is the stem for "fossil" and "fuel*" is the stem for "fuels". Contrary to the original query, which only returns documents containing the exact word "climate", the refined query can return documents containing, e.g., "climatic," but not the exact word "climate." In this example, words inputted by the user are replaced by their stems only when the query is refined. The interest of doing so is that replacing words by their stem in user queries, which is a form of query generalisation or query expansion, increases the number of results. If it is carried out at a time the query is not precise enough, the search engine may return too many irrelevant documents; the invention therefore suggests only performing stemming at some point of the refinement process. One may chose to do so after a given number of refinements.

Note that the same argument applies to refinement by categories. Refinement by a category may indeed return more documents than the original query, in as much as this query was extended by stemming. However, the refinement by category does provide a subset of the stemmed query.

In this example, it appears clearly that the documents returned after the query is refined are not necessarily associated to the keyword "fossil fuels." The exact way keywords are handled depends on the inverted index used to retrieve documents.

It is also possible to allow the user to select more than one category or one keyword as a refinement strategy. Selecting several refinement strategies at the same time may allow the user to restrict the number of documents more easily and faster. FIG. 4 is a display obtained by refining the search to the keyword "CO2 emissions" in the display of FIG. 2. The number of results returned is low, six in the example. In this case, it is possible, as exemplified on FIG. 4, to display the list of documents or sites, without any further categories or keywords. This applies notably where the number of results is less than 10, under the assumption that the user may easily browse all answers, and need not restrict the number of hits.

In FIGS. 3, 4 and 5, the search path provides links to previous keywords or searches. For instance, in FIG. 4 or 5, the user may select "Issues" in the search path, and get back to the display of FIG. 2.

FIG. 5 is another view of the display of the searching tool of FIG. 1, after the search is limited to a category of the list of results. Specifically, the display of FIG. 5 is obtained when the user selects the category "Climate Change" in the sixth result of the list of results. As explained in reference to FIG. 1, in response to a user query, documents matching the query may be returned to the user, together with a description and, when available, the categories in which this document is classified. When the user selects on one of these categories in the list, the search engine initiates a new search and displays all documents contained in the category. Preferably, the documents are ranked or sorted according to the request box. In the example of FIG. 5, category "Climate Change" includes 122 documents, all of which are displayed in the list of results. The search path shows the path to the category. Sub-categories, that is, categories referenced in the "Climate Change," are displayed.

Selecting a category in the list of results thus allows the user to navigate in all the documents of the category while maintaining the focus on its initial query, in view of the query being displayed in the display box, and possibly used for ranking documents. This capability allows the user to widen its search to documents related to the one that has been found without loosing the focus of its search. In addition, the same navigational tools as before are used, namely, subcategories and keywords. This embodiment may be carried out by using a pure ranking mechanism for queries. No boolean filter is used, except for selecting the category being visited, while navigating in a category.

Figure 6:
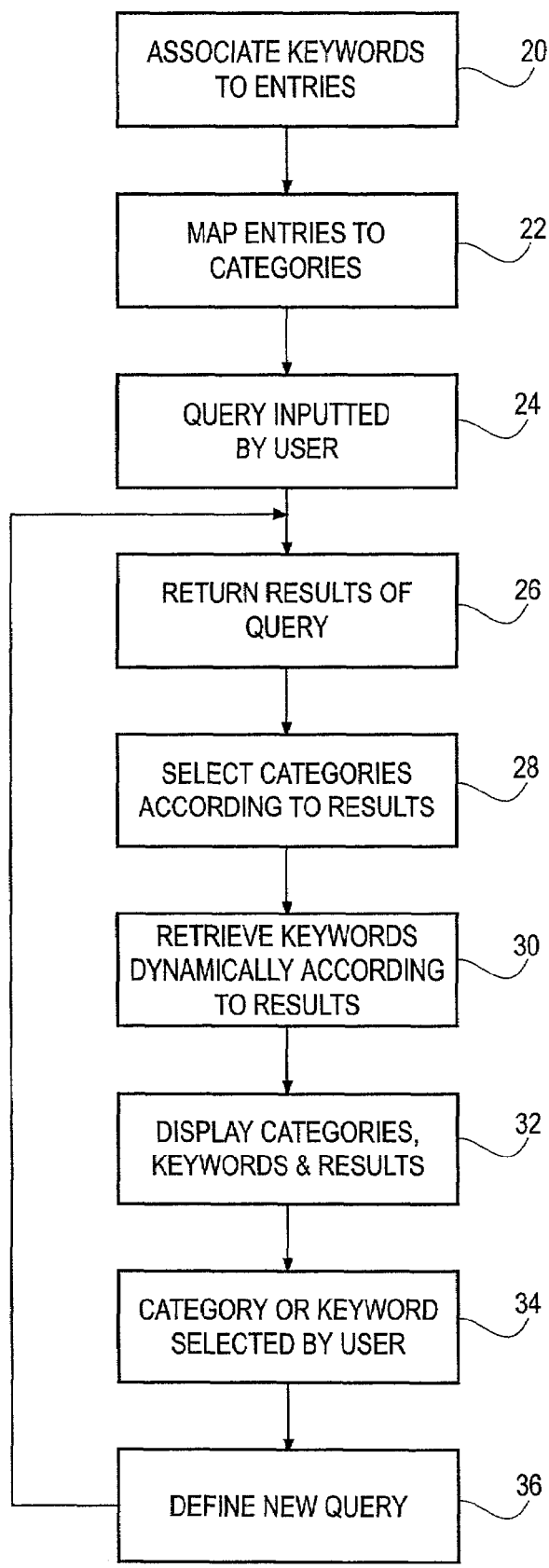
FIG. 6 is a flowchart of a process according to the invention.

FIG. 6 is a flowchart of a process according to the invention. In the first step 20, there is provided a database, that is a set of entries, such as documents or sites. Each entry is associated with zero, one or more keywords.

The database being provided, there is provided at step 22 a set of categories. As discussed above, the set of category is a "static" set. It is advantageous that the categories be organized in a tree structure for ease of navigation among the categories. However, this is by no means a requirement of the invention. A directed acyclic graph may be used, or even any type of suitable graph. Entries are then mapped to categories.

At step 24, the user inputs a query—"greenhouse effect" in the embodiment of FIG. 1. At step 26, the results of the query are returned by the search engine. They may be displayed to the user. At step 28, the results of the query are analyzed for selecting at least one category. The categories are then displayed to the user. At step 30, the results of the query are analyzed, and keywords are dynamically retrieved. These keywords are then displayed to the user. At step 32, selected categories and keywords are displayed to the user, as shown at 13 in FIG. 1. At step 34, the user selects one or more of the displayed categories and keywords. A new query is defined at step 36. The query is applied to the database, and the process may actually go back to step 26. In this manner, new results may be displayed, together with newly selected refinement strategies. Refinement strategies do not only provide restriction of the results obtained in a previous query, but may also provide new results. The search may thus be extended to other more relevant keywords and retrieve more relevant documents or sites.

The invention may be carried out as follows, in the example of a database of textual entries, using sequences of words or stems as keywords. The entries may include documents, or sites.

Four databases are set up to store respectively the inverted index of the documents words, the keywords associated with the documents, the categories associated with the documents and a summary of each document comprising for instance the document's address on the Internet and its few first lines. All four of these databases may be for instance realized using the AltaVista Search Developer's Kit augmented with a driving program realised in the C language.

Note that implementers may choose to integrate all four databases into a single database, or that there could also be an inverted index and another database holding both the categories, the keywords, and the summaries, this database being a very simple array of records indexed by the document identifiers returned by the inverted index.

An indexing phase is first carried out. Each of the documents is in turn parsed into a sequence of words; in the case stems are used, each word is associated to its stem by the algorithm described above. Using a hash table data structure, each word/stem pair is then turned into two integer numbers, a word identifier and a stem identifier. Then, assuming that keywords K are specified, e.g., as sequences of stems "S1 . . . Sn," as described above, using another hash table, the document is associated to the keywords K such that the sequence "S1 . . . Sn," appears in the document. This being done, words, stems, and keywords are used to populate the four databases using the methods described above. The words forming the document are added to the inverted index, together with their stem, the categories possibly associated with the document are added to the category database and to the inverted index, the keywords associated to the document are added to the keyword database (in full or in part), and a summary is built for the document and added to the summary database. Note that the classification of a document into a category is done manually once and for all, whereas the extraction of keywords from the documents is entirely automatic. Also, note that there is no need to add keywords to the inverted index, due to the difference in treatment between categories and keywords, as described above. For instance, assuming the refinement consists in returning only documents that contain the exact keyword "fossil fuels," one may do so by having the inverted index return only entries containing the word "fossil" immediately followed by the word "fuels." This type of feature is typically provided by modem inverted indexes, such as the one suggested above. In this case, "fossil fuels" need not be added to the inverted index as a separate or atomic entry.

A HTTP server is then set up in order to serve user queries over the Internet. One may, for example, use the Apache HTTP server.

A specialized extension module is added to this HTTP server to carry out the processing associated to the users' queries. This extension module may, for example, be realized using the C language and the Apache API, or using the Perl language and the mod_perl Apache module, or the Java language and the JServ Apache module. The specialized module carries out the process of the invention. In answer to a user's query, the module first contacts the inverted index database in order to retrieve a ranked set of documents satisfying the query. The module then contacts all three other databases in order to retrieve the categories, keywords and summaries associated with these documents.

The module is then able to carry out the keywords and categories selection processes described above. Once the relevant categories and keywords are selected, they are combined with the resulting documents for building the HTML answer page to be returned to the user by the HTTP server.

Figure 7:
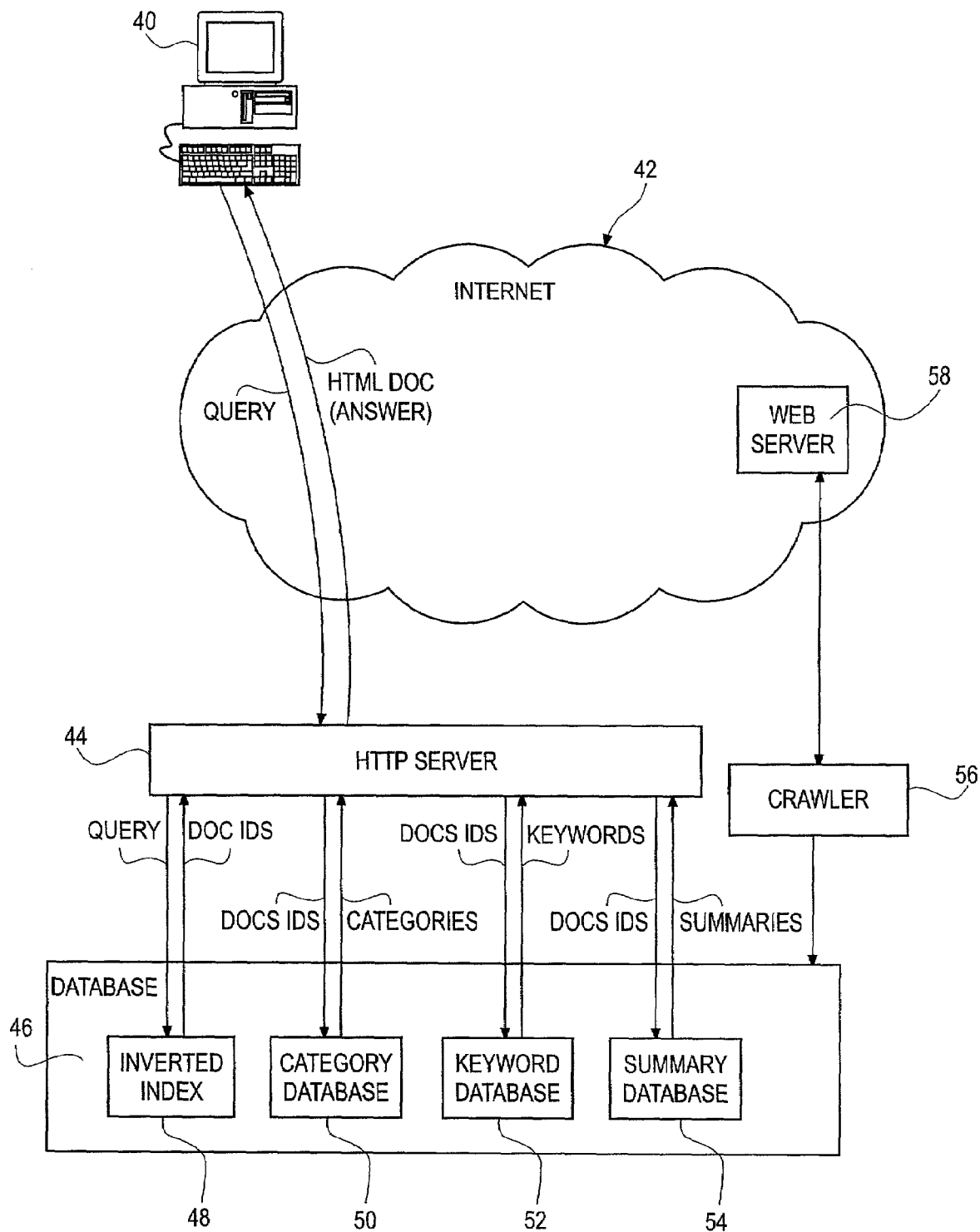
FIG. 7 is a diagram of a searching tool according to the invention.

FIG. 7 is a diagram showing a searching tool according to the invention. It shows a computer 40, which represents a user access to the tool. In the example, the tool is accessed through the Internet 42. The searching tool includes a HTTP server 44, as discussed above. This server receives the queries of the users and returns the answers as HTML documents. The searching tool also includes a database 46, as discussed above. The database includes four parts, namely an inverted index 48, a category database 50, a keyword database 52 and a summary database 54. As discussed above, in answer to a user's query, the HTTP server search module first contacts the inverted index database in order to retrieve a ranked set of documents satisfying the query. The documents may be returned simply as a list of documents Ids, as indicated in FIG. 7. The module then contacts all three other databases in order to retrieve the categories, keywords and summaries associated with these documents; as shown in FIG. 7, the module may simply send the document ID to retrieve the necessary information.

FIG. 7 further shows a crawler 56 used for referencing web servers 58. The crawler searches for new information available on the Internet, and updates the database. In the examples given above, categories have a single attribute. In other words, categories are formed of a single tree. The current category may be embodied by a pointer in a directory of categories or by a pointer to one category in the graph of categories. The invention is not limited to this form of categories. Categories could be formed of several attributes. For instance, assume the invention is applied to a professional directory. In response to a request for restaurants, proposed categories could indicate the type of restaurant, the range of prices, the geographical area, and the like. These are independent attributes, A category may then be defined as a ordered set of attributes; each attribute is selected within a directory of possible values for this attribute. The current category would then be embodied by a set of pointers, each pointer pointing out to a specific value of an attribute in the relevant directory. The use of such categories makes it possible to refine a search based on several criteria. The search may be refined independently in each attribute of a category.

The invention was disclosed in the present description in reference to Internet searches, the results of the search being documents and web sites of the World Wide Web. The invention applies more generally to searches among any type of indexed or non-indexed database, provided a number of keywords may be associated to entries of the database. In addition, the entries of the database may be at least partially mapped into categories, for returning categories and allowing the user to refine the search. In this respect, the World Wide Web is a paradigm of a database, while indexed documents or web sites are paradigms of database entries. In the embodiment of the invention disclosed in FIGS. 1 to 5, there is suggested to display a list of entries returned by the queries. The invention may actually be carried out without displaying this list, but simply by displaying refinement strategies to the user.

Last, the invention is not limited to the description made above. Other ways of populating databases may be used. Specific embodiments of a search tool and method according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A computer implemented process for searching a database of entries, comprising the steps of:
   providing a database of entries, at least part of said entries being mapped to a set of categories, at least part of said entries being associated with key phrases;
   in response to a first query of a user with a set of search terms,
      selecting among said set of categories, at least one category mapped to the entries returned by said query;
      dynamically extracting the key phrases associated with the entries returned by said query;
      dynamically selecting a subset of said extracted key phrases;
      displaying to the user said selected categories and said selected key phrases in addition to a list of entries returned by the query; and
   in response to the user activating one of said displayed categories or said displayed key phrases, starting a second query refining the first query to a subset of the entries returned by said first query.

2. The process of claim 1, wherein the categories are organized in a tree or directed acyclic graph structure.

3. The process of claim 1, wherein the key phrases are a sequence of words or a sequence of stemmed words.

4. The process of claim 1, wherein the selected categories and selected key phrases are displayed similarly.

5. The process of claim 1, wherein the selected categories are displayed separately from selected key phrases.

6. The process of one of claims 1, further including that step of starting a new query when a user activates one of said displayed categories and one of said displayed key phrases.

7. The process of claim 6, wherein the step of activating includes excluding from said query of the user a displayed category or key phrase.

8. The process of claim 6, wherein the step of activating includes refining the query of the user to said category or key phrase.

9. The process of one of claims 1, further including displaying to the user a list of entries returned by the query.

10. The process of claim 9, further including displaying in said list a category to which at least an entry of said list is mapped.

11. The process of claim 10, further including displaying the entries included in a category when the user selects said category in said list.

12. The process of claim 11, further including ranking the entries included in said category before they are displayed.

13. The process of one of claims 2, wherein categories are hierarchically organized, and wherein the step of displaying includes displaying categories of different hierarchical levels.

14. The process of claim 1, wherein a category is formed of a set of at least two attributes.

15. A computer implemented process for searching a database of entries, comprising the steps of:
  providing a database of entries, at least part of said entries being mapped to a set of hierarchically organized categories, at least part of said entries being associated with key phrases;
  in response to a first query of a user with a set of search terms,
    selecting among said set of categories, categories of different hierarchical levels mapped to the entries returned by said query;
    dynamically extracting the key phrases associated with the entries returned by said query
    dynamically selecting a subset of the key phrases associated with the entries returned by said query;
    displaying to the user said selected categories and said selected key phrases in addition to a list of entries returned by the query; and
  in response to the user, activating one of said displayed categories or said displayed key phrases, starting a second query refining the first query to a subset of the entries returned by said first query.

16. The process of claim 15, wherein the categories are organized in a tree or directed acyclic graph structure.

17. The process of claim 15, wherein a key phrase is a sequence of words or a sequence of stemmed words.

18. The process of claim 15, wherein the selected categories and selected key phrases are displayed similarly.

19. The process of claim 15, wherein the selected categories are displayed separately from selected key phrases.

20. The process of one of claims 15, further including the step of starting a new query when a user activates one of said displayed categories and key phrases.

21. The process of claim 15, wherein the step of activating includes excluding from the said query of the user a displayed category or key phrase.

22. The process of claim 15, wherein the step of activating includes refining the query of the user to said category or key phrase.

23. The process of one of claims 15, further including displaying to the user a list of entries returned by the query.

24. The process of claim 23, further including displaying in said list a category to which at least an entry of said list is mapped.

25. The process of claim 24, further including displaying the entries included in a category when the user selects said category in said list.

26. The process of claim 25, further including ranking the entries included in said category before they are displayed.

27. The process of claim 15, wherein a category is formed of a set of at least two attributes.

28. A computer implemented searching tool comprising:
  a search server for receiving queries from users, the search server transmitting results to users;
  a database of entries, at least part of said entries being mapped to a set of categories, at least part of said entries being associated with key phrases, wherein the search server includes
    means for searching the database and for selecting among said set of categories, categories mapped to the entries returned by a first query;
    means for dynamically selecting key phrases associated with the entries returned by said query;
    means for dynamically extracting the key phrases associated with the entries returned by said query;
    wherein the results transmitted to the users include said selected categories and said selected key phrases in addition to a list of entries returned by the query; and
    means for activating one of said selected categories and said selected key phrases to start a second query refining the first query, the second query returning a subset of the entries returned by the first query.

29. The tool of claim 28, wherein the search server is a HTTP server.

30. The tool of claim 28, wherein the entries are textual entries and the database includes an inverted index, said categories being entries of said inverted index.

31. A process for searching a database of entries in a computer implementation, comprising the steps of:
  providing a database of entries, at least part of said entries being mapped to a set of categories, at least part of said entries being associated with key phrases;
  in response to a first query of a user;
    selecting, among said set of categories, categories mapped to the entries returned by said query;
    dynamically extracting the key phrases associated with the entries returned by said query;
    dynamically selecting a subset of said extracted key phrases associated with the entries returned by said query;
    displaying to the user said selected categories and said selected key phrases in addition to a list of entries returned by the query, wherein a category in said set of categories is formed of a set of at least two attributes; and
  in response to the user activating one of said displayed categories and said displayed key phrases, starting a second query refining the first query to a set of entries returned by the first query.

32. The process of claim 31, wherein the categories are organized in a tree or directed acyclic graphic structure.

33. The process of claim 31, wherein a key phrase is a sequence of words or a sequence of stemmed words.

34. The process of claim 31, wherein the selected categories and selected key phrases are displayed similarly.

35. The process of claim 31, wherein the selected categories are displayed separately from selected key phrases.

36. The process of one of claims 31, further comprising a step of starting a new query when a user activates one of said displayed categories and key phrases.

37. The process of claim 36, wherein the step of activating comprises excluding from the said query of the user a displayed category or key phrase.

38. The process of claim 37, wherein the step of activating comprises refining the said query of the user to the said category or key phrase.

39. The process of claim 31, further comprising displaying to the user a list of entries returned by the query.

40. The process of claim 39, further comprising displaying in said list a category to which at least an entry of said list is mapped.

41. The process of claim 40, further comprising displaying the entries comprised in a category when the user selects said category in said list.

42. The process of claim 41, further comprising ranking the entries comprised in said category before they are displayed.

* * * * *